(12) United States Patent
Van Egmond et al.

(10) Patent No.: US 11,578,146 B2
(45) Date of Patent: Feb. 14, 2023

(54) PROCESS FOR EFFICIENT POLYMER PARTICLE PURGING

(71) Applicant: W. R. GRACE & CO.-CONN., Columbia, MD (US)

(72) Inventors: Jan W. Van Egmond, Charleston, WV (US); Jeffrey D. Goad, Barboursville, WV (US); John K. Kaarto, Missouri City, TX (US); Daniel J. Chismar, Canonsburg, PA (US)

(73) Assignee: W. R. GRACE & CO.-CONN., Columbia, MD (US)

( * ) Notice: Subject to any disclaimer, the term of this patent is extended or adjusted under 35 U.S.C. 154(b) by 26 days.

(21) Appl. No.: 17/381,355

(22) Filed: Jul. 21, 2021

(65) Prior Publication Data
US 2021/0355250 A1 Nov. 18, 2021

Related U.S. Application Data

(62) Division of application No. 16/332,009, filed as application No. PCT/US2017/050912 on Sep. 11, 2017, now Pat. No. 11,104,749.
(Continued)

(51) Int. Cl.
*C08F 2/01* (2006.01)
*C08F 6/02* (2006.01)
(Continued)

(52) U.S. Cl.
CPC ............... *C08F 2/01* (2013.01); *B01J 8/1827* (2013.01); *B01J 8/26* (2013.01); *C08F 6/006* (2013.01); *C08F 6/02* (2013.01); *C08F 6/10* (2013.01)

(58) Field of Classification Search
CPC .... C08F 2/01; C08F 6/02; C08F 6/006; C08F 6/10; B01J 8/26; B01J 8/1827
See application file for complete search history.

(56) References Cited

U.S. PATENT DOCUMENTS 3,770,714 A * 11/1973 Dorschner et al. ....... C08F 2/34
526/65
4,332,933 A 6/1982 Di Drusco et al.
(Continued)

FOREIGN PATENT DOCUMENTS

| CN | 101517500 A | 8/2009 |
|---|---|---|
| CN | 103874715 A | 6/2014 |

(Continued)

OTHER PUBLICATIONS

International Search Report issued in PCT/US2017/050912 dated Nov. 13, 2017.
(Continued)

*Primary Examiner* — Robert D Harlan
(74) *Attorney, Agent, or Firm* — Foley & Lardner LLP

(57) ABSTRACT

A process comprising polymerizing olefin monomers and optionally comonomers in a first reactor vessel, thereby forming a raw product stream comprising polymerized solids, unreacted monomer and optionally comonomer, the polymerized solids comprising olefin polymer, volatile organic compounds (VOC) and catalyst system. Then the polymerized solids are contacted with a catalyst poison selected from carbon monoxide, carbon dioxide, oxygen, water, alcohols, amines, or mixtures thereof, thereby forming a passivated stream. The passivated stream is maintained in an agitated state within a second reactor. The passivated stream within the second reactor is then contacted with a circulating gas comprising unreacted monomer for a residence time, thereby reducing the concentration of VOC in the polymerized solids by at least 10 wt % compared to the
(Continued)

level before entering the second reactor, thereby forming a purified olefin polymer solids stream.

6 Claims, 2 Drawing Sheets

Related U.S. Application Data

(60) Provisional application No. 62/395,636, filed on Sep. 16, 2016.

(51) Int. Cl.
  *C08F 6/10* (2006.01)
  *C08F 6/00* (2006.01)
  *B01J 8/18* (2006.01)
  *B01J 8/26* (2006.01)

(56) References Cited

U.S. PATENT DOCUMENTS

| | | | |
|---|---|---|---|
| 4,372,758 | A | 2/1983 | Bobst et al. |
| 4,758,654 | A | 7/1988 | Brod et al. |
| 5,262,190 | A | 11/1993 | Cunningham et al. |
| 5,548,042 | A | 8/1996 | Goode |
| 5,703,203 | A | 12/1997 | Fezza et al. |
| 6,013,741 | A | 1/2000 | Ohtani et al. |
| 6,251,817 | B1 | 6/2001 | Erickson |
| 6,262,190 | B1* | 7/2001 | Joyce ............... B01J 8/0005 526/59 |
| 7,786,254 | B2 | 8/2010 | Baita et al. |
| 2008/0005058 | A1 | 1/2008 | Olander et al. |
| 2008/0052058 | A1* | 2/2008 | Odi .................. C08F 6/003 703/12 |
| 2014/0171602 | A1* | 6/2014 | Bhandarkar ........... C08F 10/02 526/64 |
| 2015/0081251 | A1 | 3/2015 | Gittings et al. |
| 2016/0108221 | A1 | 4/2016 | Sibtain et al. |

FOREIGN PATENT DOCUMENTS

| | | |
|---|---|---|
| CN | 105121001 A1 | 12/2015 |
| CN | 1505642 | 9/2017 |
| EP | 1995259 A1 | 11/2008 |
| EP | 2370478 A1 | 10/2011 |
| WO | 1993/13843 A1 | 7/1993 |
| WO | 1999/65953 A1 | 12/1999 |
| WO | 2000/65953 A1 | 11/2000 |
| WO | 2006130310 | 12/2006 |
| WO | 2008/080782 A1 | 7/2008 |
| WO | 2015081251 A1 | 6/2015 |

OTHER PUBLICATIONS

First Office Action issued in related Chinese Application No. 201780055896.5, dated Feb. 20, 2021, 10 pages.
First Examination Report in related Indian Application No. 201917008703, dated Mar. 30, 2021, 5 pages.
Indonesia Office Action (with English translation) for App. No. PID201902202, dated Jul. 27, 2021, 4 pages.
European Patent Office Communication pursuant to Article 94(3) EPC for App. No. EP17851366.9, dated Aug. 11, 2021, 4 pages.
Chinese Notice of Attending to Patent Registration for App. No. 201780055896.5, dated Aug. 16, 2021, 4 pages.

\* cited by examiner

PROCESS FOR EFFICIENT POLYMER PARTICLE PURGING

FIELD OF THE INVENTION

The invention relates to the efficient purging of polymer particles. More particularly, the invention relates to the removal of volatile organic compounds from olefin polymer particles in a fluidized bed gas-phase reactor.

BACKGROUND OF THE INVENTION

The role of plastics in the daily life of modern consumers is extensive. They are present in virtually all activities, e.g., in the polyethylene bottles used to hold milk, the polypropylene containers and film that store food and keep it fresh, or the polybutene used in peelable seals for packaging and hot-melt adhesives. Production processes and catalyst systems have long been developed to produce the spectrum of plastic grades required to meet various commercial needs. However, despite numerous developments in the production of olefin polymer materials, impurities such as volatile organic compounds can accompany polymer production. These are produced as part of the polymer manufacturing process, and at higher levels can potentially affect product quality, the ability to efficiently process the polymer downstream, and environmental controls. Unfortunately, these impurities are difficult or expensive to reduce in the final product using conventional means.

Efforts have been ongoing to develop improved processes for removing impurities in the polymer stream. These have taken the form of using dedicated purging vessels, where steam is used to passivate catalyst within the polymer particles and inert gas to purge the polymeric material of monomer. Examples of such systems include U.S. Pat. Nos. 4,332,933, 4,372,758, 4,758,654, 5,703,203, 7,786,254; International Publication Numbers WO93/13843, WO00/65953, WO1999065953, and WO2008/080782, U.S. Patent Application Publication Numbers 2008005058 and 2008/0052058; and European Patent No. EP 2,370,478. Nevertheless, a continuing need exists for processes that reduce polymer impurities. It has unexpectedly been found that by treating the polymer in a fluidized bed gas phase reactor with a circulating gas stream containing unreacted monomer, enhanced impurity removal is possible. Utilizing idle reactor capacity as the purging vessel enhances process flexibility, and potentially enables the design/use of smaller purge vessels.

SUMMARY OF THE INVENTION

In one embodiment, the disclosure of the present subject matter relates to a process comprising: polymerizing olefin monomers and optionally comonomers in a first reactor vessel, thereby forming a raw product stream comprising polymerized solids, unreacted monomer and optionally comonomer, the polymerized solids comprising olefin polymer, volatile organic compounds (VOC) and catalyst system. Then the polymerized solids are contacted with a catalyst poison selected from carbon monoxide, carbon dioxide, oxygen, water, alcohols, amines, or mixtures thereof, thereby forming a passivated stream. The passivated stream is maintained in a fluidized state within a second reactor. The passivated stream within the second reactor is then contacted with a circulating gas comprising unreacted monomer for a residence time, thereby reducing the concentration of VOC in the polymerized solids by at least 10 wt % compared to the level before entering the second reactor, thereby forming a purified olefin polymer solids stream.

In another embodiment, the subject matter of the present disclosure relates to a polymer produced by the above process.

In still another embodiment, the subject matter of the present disclosure relates to a process comprising: polymerizing olefin monomers and optionally comonomers in a two reactor system comprising a first reactor and a second reactor, where a polymerization product of the first reactor is routed to a second reactor where it is mixed with a polymerization product of the second reactor, thereby forming a raw product stream comprising polymerized solids and unreacted monomer and optionally comonomer, the polymerized solids comprising olefin polymer, VOC and a catalyst system. Then the raw product is routed to a storage silo, thereby forming a stored polymerized solids stream. Polymerization is discontinued in the second reactor, and the stored polymerized solids are routed to the second reactor. The stored polymerized solids stream is contacted with a catalyst poison selected from carbon monoxide, carbon dioxide, oxygen, water, alcohols, amines, or mixtures thereof, thereby forming a passivated stream. The passivated stream is maintained in a fluidized state within a second reactor, and finally, the passivated stream is contacted in the second reactor with a circulating gas comprising unreacted monomer for a residence time, thereby reducing the concentration of VOC in the polymerized solids by at least 10 wt % compared to the level before entering the second reactor, thereby forming a purified olefin polymer solids stream.

In still another embodiment the subject matter of the present disclosure relates to a process comprising polymerizing olefin monomers and optionally comonomers in a first reactor vessel, thereby forming a raw product stream comprising polymerized solids, unreacted monomer and optionally comonomer, the polymerized solids comprising olefin polymer, VOC and a catalyst system. Then the polymerized solids are contacted with a catalyst poison selected from carbon monoxide, carbon dioxide, oxygen, water, alcohols, amines, or mixtures thereof, thereby forming a passivated stream. The passivated stream is maintained in an agitated state within a fluidized bed second reactor with a circulating gas comprising unreacted monomer for a residence time, thereby reducing the concentration of VOC in the polymerized solids by at least 10 wt % compared to the level before entering the second reactor, thereby forming a purified olefin polymer solids stream.

BRIEF DESCRIPTION OF THE DRAWINGS

The invention will be more fully understood from the following detailed description, taken in connection with the accompanying drawings, in which.

DETAILED DESCRIPTION OF THE INVENTION

Figure 1:
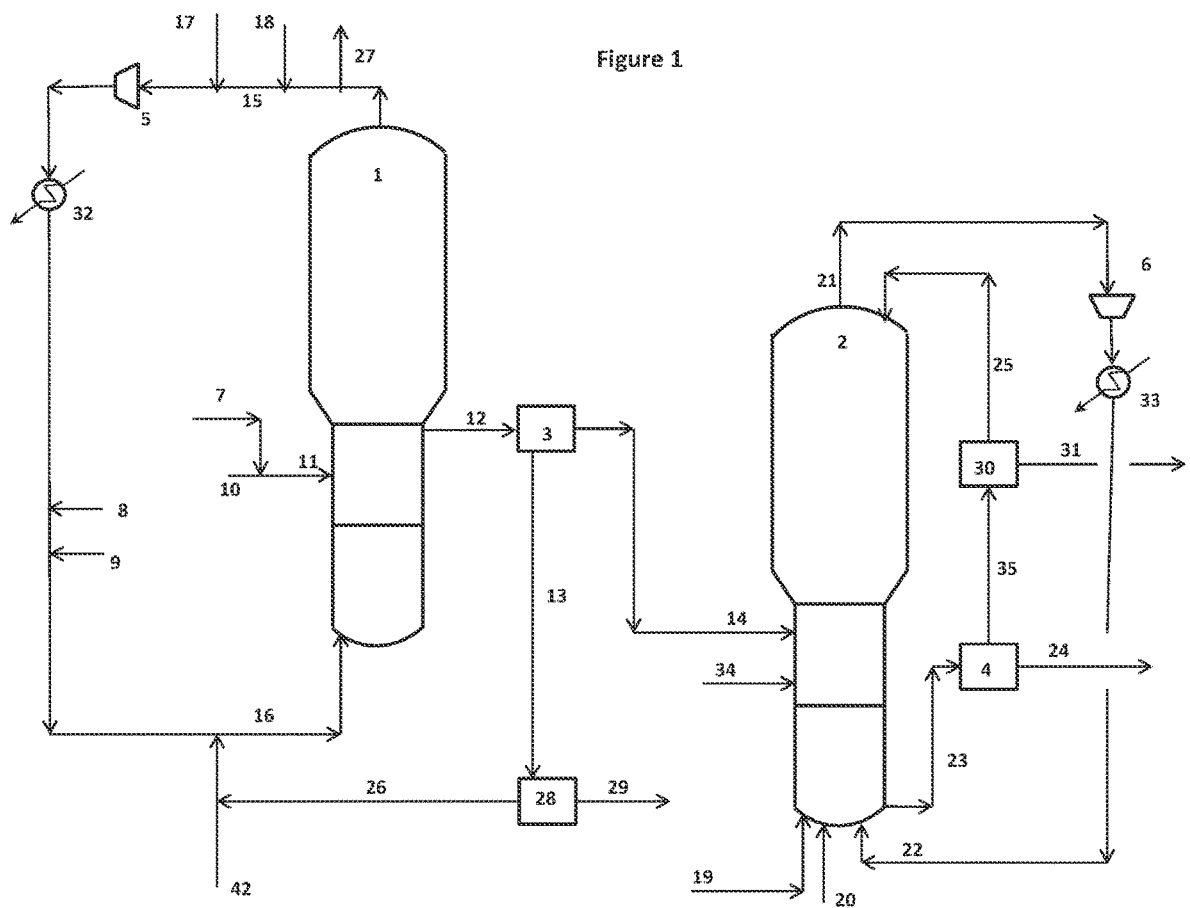
FIG. 1 illustrates a conventional polyolefin production process involving two reactors in series where polymer product flows from a first reactor to a second reactor, where additional olefin polymerization takes place.

The subject matter of the current specification relates to a fluidized high-temperature purging process for reducing or removing volatile organic compounds generated during the production of polymeric material.

Volatile Organic Compounds

For the purpose of this specification, the term Volatile Organic Compounds (VOC) means the total of n-$C_7$ to n-$C_{12}$ hydrocarbons comprising oligomers of $C_2$ and $C_3$ material as measured by the VOC measurement technique, and includes all isomers eluting between the n-$C_7$ to n-$C_{12}$ hydrocarbon peaks using the GC column and conditions as described below.

Treated Polymers

Polymers that can be treated by the process of the current specification include 1-olefin polymers such polypropylene, polyethylene, and polybutene; polystyrene, polyisoprene, polybutadiene, and SBR, and their polymers and copolymers with butyl, isoprene, nitriles, dienes, styrenes, carbonates, isocyanates, vinyl chlorides and mixtures thereof. When the polymer is polypropylene, it preferably includes propylene homopolymers, copolymers of propylene with ethylene or $C_{4-10}$ alpha-olefins, and terpolymers of propylene with $C_2$ and $C_{4-8}$ olefins. When the polymer is polyethylene, it preferably includes ethylene homopolymers and copolymers or terpolymers of ethylene with $C_{3-10}$ alpha-olefins. When the polymer is polybutene, it preferably includes butene-1 homopolymers and butene-1 copolymers or terpolymers with $C_{2-3}$ or $C_{5-8}$ alpha-olefins. Preferably, the polymers to be treated by the process include polypropylene, polyethylene and polybutene or combinations thereof. More preferably, the polymers are polypropylene.

Catalyst Systems

The above polymers are produced in polymerization processes where, as the polymerization reaction proceeds, the polymer forms around the catalyst particles, so that the catalyst particle becomes part of the polymer itself. The catalyst system used in the current process thus remains active within the polymer as the polymer proceeds from the first reactor to the second reactor, and can react with unreacted monomer and comonomer in the second reactor.

The catalyst systems used in the current process are preferably olefin polymerization catalysts. Even more preferably, the olefin polymerization catalysts can include those containing transition metal salts of metals from groups IV to VII, and a metal alkyl of a base metal from groups I to III as cocatalyst, commonly known as Ziegler Natta catalysts. Phillips catalysts, produced by the impregnation of $CrO_3$ onto $SiO_2$, can also be used, as well as single site catalysts, such as metallocenes, and late transition metal catalysts. Preferably, a single catalyst is used. More preferably, the catalyst used is a Ziegler Natta heterogeneous catalyst containing an inorganic solid catalyst support, optional internal electron donor(s) such as succinates, diethers, phthalates, substituted phenylene aromatic diesters and benzoates, an external electron donor and an alkyl aluminum co-catalyst. The combination of support and internal electron donor is typically referred to as a pro-catalyst. More preferably, the alkyl aluminum co-catalyst is tri-ethyl aluminum (TEAL). The pro-catalyst, external electron donor and co-catalyst can be combined in the reactor to form the active catalyst, or the pro-catalyst can be pre-polymerized or pre-activated. Preferably, the catalyst system does not include catalyst systems containing mixtures of two or more different particulate catalyst solids where the active centers are present on the same support. This includes the so-called bimetallic catalysts containing two transition metal compounds, e.g., a cyclopentadienyl complex of a transition metal and a non-metallocene derivative of a transition metal, or metallocene/chromium catalyst-based systems. The active centers of such systems have different responses to catalytic inhibitors (poisons), such as water or carbon dioxide, which could require careful selection of deactivation methods of the catalyst in the second reactor.

Polymer Purging Process

Modern polymerization processes producing a full range of polypropylene products typically comprise multiple reactors. While a single reactor is suitable for homopolymers, additional reactors are required in order to make the ethylene-propylene-rubber (EPR) rubber component in polypropylene impact copolymers (ICP). Multiple reactors (2, 3, or 4) are also used for bimodal, multimodal, dual random copolymers, bimodal matrix ICP, and for impact copolymers containing multiple types of EPR (e.g. EPR's with different comonomer content and/or different molecular weight). The reactors used for the EPR component of ICP are gas phase reactors in most processes. When these multi-reactor lines are used for simple (mono-modal) homopolymers, the reactors downstream of the first reactor are often by-passed. The inventive process of this specification is to repurpose these gas phase reactors to purge VOC from the polypropylene while still using monomer as fluidization and purging medium (gas), but without any further polymerization occurring.

In the polymer purging process, polymer produced in a reactor or reactors, along with VOC, is transferred to a reactor where separation of the undesirable materials from the polymer takes place. Such a reactor system can include two polymer reactors connected in series, where the first reactor produces the polymer product, and the second reactor is used to purge impurities from the polymer product. For example, a propylene homopolymer is made in a first, upstream reactor. The homopolymer, along with VOC is then transferred directly to a second reactor where the VOC is separated from the olefin polymer.

For the purpose of this specification, unless otherwise noted, the term "first reactor" refers to the reactor producing the polymeric material that will be processed in the second reactor to remove VOC. One skilled in the art will understand that the first reactor could be used alone or as the final reactor in a series of one, two, three, four or more reactors producing a multi-reactor polymeric product, as described above for the production of, for example, ICP or EPR polymers, followed by the additional reactor for purging. Preferably, the reactor system contains a total of two to four reactors where one of the reactors serves as the purging reactor.

For the purposes of this specification, the term "second reactor," unless otherwise noted, means the reactor receiving reactor product produced in the first reactor. As discussed above, the second reactor is preferably a reactor that is normally used in a polymerization train of reactors that is temporarily idled and dedicated to polymer purging. When the polymer purging operation is complete, the idled reactor can be returned to polymerization service.

The first and second reactor vessels can be any reactor vessel typically used in the polymerization of olefins; for example, a fluidized bed gas phase reactor, loop reactor, vertical stirred bed reactor, horizontal or vertical stirred gas phase reactors, multizone circulating reactors, or stirred autoclave reactors. Preferably, the first and second reactor vessels are a fluidized bed gas phase reactor.

Alternately, the reactor system of two, three, four or more reactors can initially be operated in series to produce a multi-reactor polymer product, which is then conveyed to a conventional purge bin and stored in a silo. After completion of the multi-reactor product manufacturing cycle, the polymerization reactor system is switched to one having an idle reactor. Then, while polymerization is conducted in the first reactor, the (idled) second reactor can be used to purge impurities from the silo-stored material. In such a system, it is also possible to simultaneously feed both the silo-stored material and polymer from the first reactor.

Preferably, olefin polymer produced in a first reactor is transferred directly to a second reactor where purging of VOC's and oligomers is conducted, without interim storage in a silo or vessel.

Raw product from the first reactor contains polymerized solids, catalyst, and unreacted monomer, the polymerized solids containing olefin polymers and VOC. The VOC is present in the polymerized solids from the first reactor in an amount from 50 to 6000 ppm, alternately, 50 to 1000 ppm, or alternately, 100 to 500 ppm, based on the total weight of the polymerized solids.

The second reactor is a gas phase reactor where the polymerized solids are maintained in an agitated state, where for the purposes of this specification, the term "agitated state," means that the polymerized solids are maintained in motion relative to the reactor walls. In the case of a second reactor with equipment for agitation or stirring, the agitated state is maintained by the agitation or stirring equipment and/or with a circulating gas. In the case of a fluidized bed reactor, the agitated state is maintained by the upward gas flow of circulating gas in the second reactor vessel. The circulating gas contacts the polymerized solids, thereby reducing the concentration of VOC in the polymerized solids, transferring it to the circulating gas. The circulating gas has sufficiently high velocity and temperature for efficient purging. Alternately, the second reactor vessel is an agitated or stirred gas phase reactor where the polymerized solids in the reactor are stirred or agitated to maintain an agitated state. The polymerized solids are again contacted with a circulating gas as described above to remove VOC. The polymerized solids are maintained in the agitated state at a temperature that is below the melting point of the polymer, so that mass transfer of the impurities from the polymer to the gas can occur. Preferably, the temperature of the polymerized solids and the circulating gas used to heat it are greater than the temperature of the first reactor, more preferably at a temperature from 20° to 140° C., even more preferably, from 70° to 120° C., and most preferably from 90° to 120° C. The operating pressure of the second reactor is 0 to 500 psig, preferably, 200 to 500 psig, and more preferably, 300 to 500 psig. The superficial gas velocity of the circulating gas in the second reactor is greater than 0.3 m/s, preferably greater than 0.3 m/s to 1 m/s, more preferably, greater than 0.3 to 0.6 m/s. Alternately, the superficial velocity can be greater than 1.0 m/s, i.e., in fast fluidization bed mode. The average residence time in the second reactor, defined as the reactor bed weight divided by the mass production rate, ranges from 0.1 hour to 5 hours, preferably 0.5 to 5.0 hours, more preferably from 0.75 hour to 8.0 hours, and most preferably, from 4.0 to 8.0 hours. Removal of the VOC from the polymerized solids is favored by higher gas superficial velocity and higher gas temperature. The circulating gas used to fluidize the solids contains unreacted monomer(s), VOC, other very volatile material boiling at about 50° C. or less, and other impurities such as methane, hydrogen and nitrogen, ethane, propane, butane, isopentane and other alkanes. In addition, catalyst activators such as TEAL; external donors such as silanes and esters; and activity limiting agents, such as carboxylic acid esters, poly(alkene glycols), and diol esters, may be present. The unreacted monomer(s) are present in the circulating gas in a range of from 50.0 to 99.5 wt %, preferably, 70.0 to 99.0 wt %, and more preferably, 80.0 to 99.0 wt %, based on the total weight of the circulating gas. Preferably, the unreacted monomers are selected from ethylene, propylene and $C_4$-$C_{10}$ alpha-olefins or mixtures thereof. More preferably, the unreacted monomers are selected from ethylene, propylene or mixtures thereof. Even more preferably, the unreacted monomers are propylene.

The finished product exiting the second reactor as a purified olefin polymer solids stream contains olefin polymer solids with a reduced level of VOC compared to the olefin polymer solids prior to treatment in the second reactor. After the treatment in the second reactor, the concentration of VOC in the olefin polymer is typically reduced by at least 10 wt % compared to the level of VOC in the olefin polymer solids prior to treatment. Preferably, the concentration of VOC has been reduced at least 20 wt %. Alternately, the level of VOC reduction in the olefin polymer ranges from 25.0 to 85.0 wt % or 25.0 to 55.0 wt % compared to the level of VOC prior to the purging. Typically, the range of VOC in the treated polymerized solids is 10 to 1000 ppm. Preferably, the VOC in the treated polymerized solids is from 10 to 500 ppm.

In addition to the olefin polymer solids, the finished product contains entrained amounts of circulating gas, as described above. The finished product can be further processed by separating the olefin polymer solids from the entrained circulating gas to form a separated olefin polymer solids stream and a separated gas stream. In a vapor recovery step, the separated gas stream is processed to further separate unreacted monomer from the VOC and other gaseous materials present in the separated gas stream, thereby forming an enriched monomer stream and a purge stream containing the remainder of the separated gas stream.

Treatment of solids in the second reactor can either be conducted continuously or batchwise. Solids from the first reactor can also be stored temporarily in a vessel or silo before treatment in the second reactor. When the solids are to be temporarily stored in the vessel or silo, the solids can optionally be preliminarily treated, e.g., with a stream of wet nitrogen or steam in a purge bin prior to the vessel or silo, to passivate catalyst in the solids, before being routed to the second reactor.

Injection of Catalyst Poisons

The catalytic reactions occurring in the first reactor should not freely continue in the second. However, because catalyst is present in the polymerized solids, and continues to be reactive toward unreacted monomer, it is necessary to inject catalyst poison into the second reactor to inhibit residual polymerization reactions that would result in VOC or other impurities. The catalyst poison is fed at a rate sufficient to decrease or terminate the polymerization reaction. Preferably, sufficient catalyst poison is fed to terminate the polymerization reaction. For the purpose of this specification, the term "terminate" the polymerization reaction means that poison is added at the level of at least the amount of poison required to substantially deactivate the catalyst and co-catalyst, if used, so that there is no polymerization activity. Preferably, when it is desired to substantially terminate the polymerization reaction, the poison is used in an amount similar to or in excess of the stoichiometric amount to deactivate the catalyst and co-catalyst, e.g., in a range of 0.5 to about 50 times the stoichiometric amount used required. When a cocatalyst is used, the poison is preferably added at a molar ratio of poison/co-catalyst of at least 0.5, more preferably a ratio of 0.5 to 50, and even more preferably of 1.0 to 40.0, and most preferably 3.0 to 30.0. Examples of the poison include carbon monoxide, water, oxygen, alcohols, amines or carbon dioxide. Preferably, the poison is carbon monoxide or carbon dioxide.

Typically, the catalyst poison is injected into the feed line routing polymerized solids to the second reactor after exiting the first reactor. Alternately, the catalyst poison can be injected directly into the reactor or in the gas recirculating line. The catalyst poison can be conveyed by itself or with a conveying fluid containing nitrogen, hydrogen, propylene, ethylene or mixtures thereof.

Referring now to FIG. 1, it illustrates a conventional multi-reactor propylene polymerization process. One skilled in the art would understand that while the figure shows a configuration where copolymers can be made in both reactors, it encompasses operation where 1-olefin homopolymers are made in either or both reactors, and that monomers other than propylene and ethylene can be polymerized. Further, additional monomers can be processed to produce terpolymers. In the figure, a propylene catalyst carrier stream 10, and catalyst system 7 are routed through line 11 to reactor 1. Propylene is fed to stream 16 by stream 42. Hydrogen 18 and an optional, additional comonomer 17, e.g., ethylene, are also routed to reactor 1. The monomers are polymerized in reactor 1 to form polymerized solids. A mixture 12 of the polymerized solids, unreacted monomer, hydrogen, propylene polymer, and VOC flow to separator 3 where gas stream 13 is separated from solids 14 and routed to a vapor recovery step 28. Solids 14 containing entrained unreacted monomer and VOC are routed to reactor 2. In vapor recovery step 28, gas stream 13 containing unreacted monomer, VOC and other volatiles and gases are separated into a purge stream 29 and an enriched monomer stream 26. Purge stream 29 is routed to downstream processing equipment. Enriched monomer stream 26 is returned to reactor 1. Overhead gas 15 of reactor 1 flows through compressor 5 and cooler 32. Downstream of cooler 32, cocatalyst 8 and electron donor 9 are added to the recirculated gas stream. The compressed and cooled recirculated gas, along with the electron donor 9 and cocatalyst 8 are routed as stream 16 back to reactor 1 to fluidize the bed. A gas purge stream 27 can be removed from reactor 1.

In reactor 2, a second polymerization takes place where a propylene stream 34, optional comonomer stream 19, and hydrogen stream 20 are routed to reactor 2. A stream 23 containing polymerized solids, unreacted monomer, VOC and other volatiles and gases are routed to separator 4 where the polymerized solids 24 are separated from a stream 35 containing unreacted monomer, VOC and other volatiles and gases. Solids 24 are collected for downstream processing including additives addition and extrusion. Gas stream 35 is routed to vapor recovery step 30, where it is separated into an enriched monomer stream 25 and purge stream 31. Purge stream 31 is routed for further downstream processing. Enriched monomer gas stream 25 containing unreacted monomer(s) is routed back to reactor 2. Overhead gas 21 of reactor 2 flows through compressor 6 and cooler 33, with the compressed and cooled stream 22 being routed back to reactor 2 to fluidize the bed.

Figure 2:
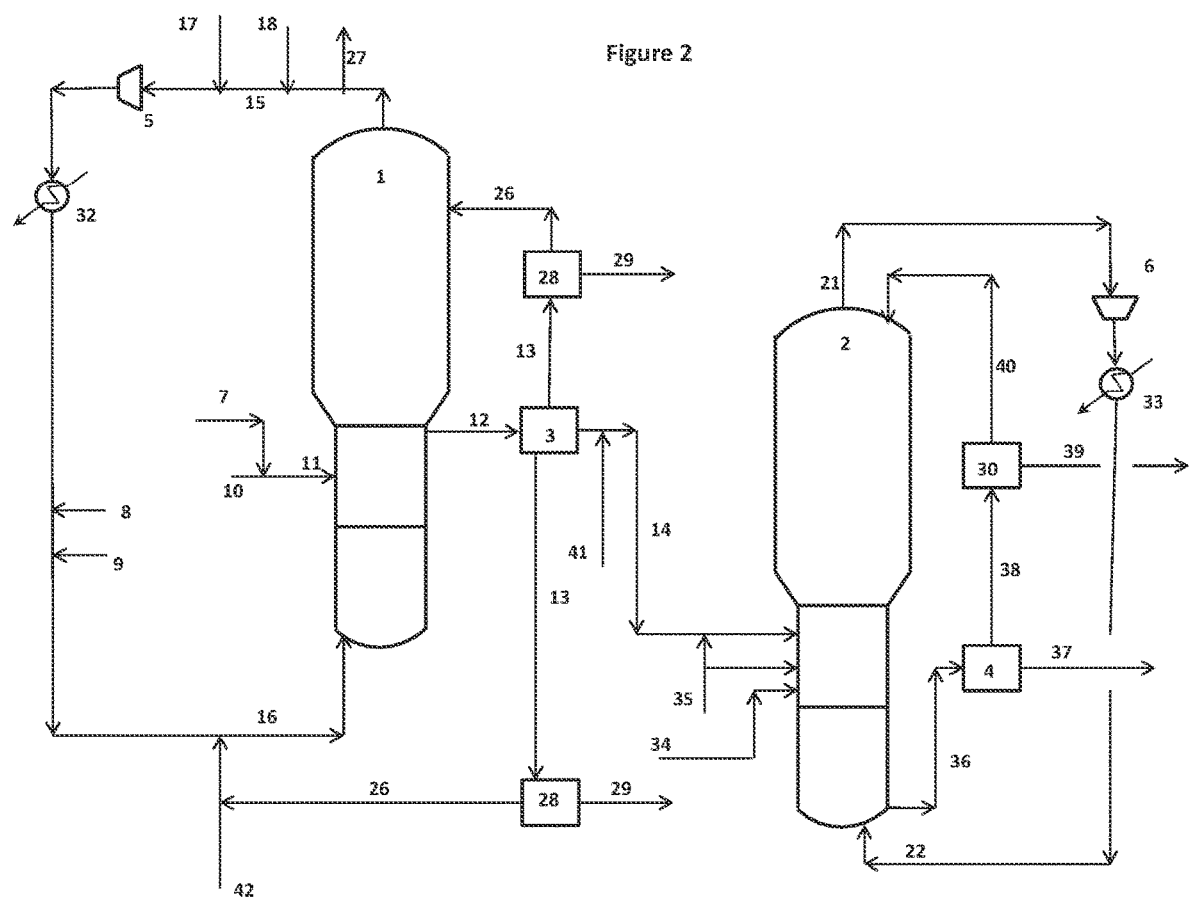
FIG. 2 illustrates two olefin polymerization reactors configured in series as in FIG. 1, where polymerization product from the first reactor flows to the second reactor, where impurities are purged.

Referring now to FIG. 2, it illustrates an embodiment of the current subject matter. A conventional propylene polymerization process in reactor 1 is shown as in FIG. 1. A stream 14 containing polymerized solids, VOC, unreacted monomers, and other volatiles and gases are routed to reactor 2. Propylene 34 is optionally added as necessary to maintain pressure. Alternately, or addition to stream 14, a previously polymerized solids stream 41 from a silo or bin can be routed to reactor 2. A catalyst poison stream 35 is injected into stream 14 prior to flowing to reactor 2. The catalyst poison 35 can also be routed directly into reactor 2. Catalyst, co-catalyst and hydrogen are not routed to reactor 2. A fluidized bed is maintained in reactor 2 at the temperatures, pressures and for the residence times discussed above by circulating an overhead gas stream 21 through a compressor 6 and cooler 33, and routing the compressed and cooled circulating gas 22 back to reactor 2. While in reactor 2, VOC is transferred from the polymerized solids to the circulating gas 22. A finished product stream 36 containing polymerized solids, unreacted monomer, residual VOC, other volatiles and gases are routed to separator 4 where the olefin polymer solids 37 are separated from a stream 38 containing unreacted monomer, VOC and other volatiles and gases. Olefin polymer solids 37 are collected for downstream processing including additives addition and extrusion. Gas stream 38 is routed to vapor recovery step 30, where it is separated into a purge stream 39 and an enriched monomer stream 40. Purge stream 39 is routed for further downstream processing. Enriched monomer gas stream 40 containing unreacted monomer(s) is routed back to reactor 2. The vapor recovery step 30 typically includes the use of fractionation equipment such as distillation columns and condensers to produce at least one enriched monomer gas stream that is lean in impurities (non-monomers) and a purge stream that is rich in impurities Alternately, previously produced polymerized solids 41 from a storage vessel or silo can be introduced into reactor 2 for VOC removal. Such solids can be fed concurrently with currently-produced material from reactor 1 or without, if reactor 1 is idle.

Reactor 2 can be configured as in FIG. 1 to operate in a swing role as polymerization reactor or purge-treatment vessel. In other words, the service of reactor 2 can be routinely switched from polymerization reactor, to purge-treatment vessel for product from the first reactor when only a single reactor is required for polymerization, and then back again to a polymerization reactor.

The following Examples further detail and explain the process to purge impurities from a polymer stream. Those skilled in the art will recognize many variations that are within the spirit of the invention and scope of the claims.

EXAMPLES

Melt Flow Rate Measurement

Melt Flow Rate (MFR) is measured in accordance with ASTM D-1238-01 test method at 230° C. with a 2.16 kg weight for propylene-based polymers.

Xylene Solubles Measurement

A weighed amount of sample is dissolved in xylene under reflux conditions. The solution is then cooled under controlled conditions and maintained at a 25° C. equilibrium temperature so that the crystallization of the insoluble fraction takes place. When the solution is cooled, the insoluble portion precipitates and is isolated by filtration. The xylene is evaporated from the filtrate, leaving the soluble fraction in the residue. The percentage of this fraction in the polymer is determined gravimetric ally.

Ethylene Content Measurement

The determination of ethylene content in copolymerized polymers uses IR spectroscopy and is based on the peak heights or area in the 700-750 $cm^{-1}$ IR spectrum, using a calibration of standards with known concentrations. Samples are compression-molded films. Samples are measured using Beer's Law Univariate calibration using the formula Y=mx+b, where Y is the analyte concentration, m is the slope of the calibration line, b is the intercept of the calibration line and x is the IR data (analyte peak height/path length).

VOC Measurement

The procedure for measuring the VOC in both granular and pelletized olefin polymer resin is based on ASTM D4526, modified as described below to correct for volatiles dissolved in the resin according to Henry's law.

1. Sampling

Sampling the resin and sealing the sampling container is performed so as to avoid loss of residual volatiles. Teflon- or aluminum-coated septa are used to avoid absorption of volatiles into the septa. The coated side of the septum must face the vial interior. A 0.5 to 2 g resin sample, preferably close to 1 g, is taken.

2. Procedure

A) Operating Parameters

The resin sample is analyzed by gas chromatography using the following parameters.

B) Calibration and Standardization

Two different calibration standards are used for this method: the first is a gas standard, containing $C_1$ to $C_5$ hydrocarbons; the second is a liquid standard, containing polar analytes and hydrocarbons greater than $C_5$ that need to be measured.

Calibration is affected by different sample equilibration temperatures; two separate calibrations may be necessary where both granular and pelleted samples are routinely analyzed.

1) Calibration of Light Hydrocarbons (Gas Standard)

Calibration is performed using a certified gas standard that contains between 50 to 100 parts per million volume (ppmv) of methane, ethane, ethylene, propane, propylene, n-butane, isobutane, 1-butene, cis-2-butene, trans-2-butene, isobutene, and isopentane in a nitrogen matrix.

A headspace vial is filled with calibration gas by capping an empty vial and using two narrow bore needles (one supplying gas from the calibration cylinder and the other

| | |
|---|---|
| Instrument: | Agilent Technologies 7890A with a capillary split inlet, two flame ionization detectors and an Agilent G1888 automatic headspace sampler or equivalent. An electronic data system is used in conjunction with the gas chromatograph. |
| Detectors: | Flame ionization |
| Columns: | (1.) GS-Gas Pro, 60 m × 0.32 mm i.d.<br>(2.) DB-1, 60 m × 0.32 mm i.d., 5 □m film thickness. Columns are coupled to 1 m × 0.32 mm deactivated fused silica tubing using a glass Y-connector. Equivalent flow for each column is achieved by trimming some length from the column with the lowest flow rate (generally 1-2 meters from the DB-1). |
| Temperatures: | |
| Injector: | 200° C. |
| Detector: | 280° C. |
| Oven: | Initial temperature 40° C. (hold 2 min);<br>  2° C./min up to 70° C.;<br>  6° C./min up to 130° C. (hold 4 min);<br>  10° C./min up to 250° C. (hold 10 min) |
| Carrier gas: | Helium, flow rate≈3.1 mL/min per column (constant flow mode) |
| Detector gases: | |
| Hydrogen: | 40 mL/minute |
| Air, | 450 mL/minute |
| Helium or Nitrogen make-up | 45 mL/minute, combined flow (i.e. column flow + make-up flow) |
| Sample size: 1 milliliter (from headspace sampler) | |
| Inlet Split vent flow: | 60 mL/minute |
| Headspace | |
| Vial Pressurization | 0.12 MPa (18 psi) |
| Oven temperature | 70° C., granular<br>110° C., pellets |
| Loop temperature | 90° C., granular<br>120° C., pellets |
| Transfer temperature | 90° C., granular<br>120° C., pellets |
| Vial equilibration time | 60 min, granular<br>180 min, pellets<br>  3 min, calibration gas<br>15 min, polar (liquid) calibration solution |
| GC Cycle time | 63 min (instrument dependent) |
| Vial Pressurization time | 2.0 minutes |
| Loop fill time | 0.2 minutes |
| Loop equilibration time | 0.1 minutes |
| Injection time | 0.1 minutes | providing a vent flow). Connecting the vent needle to a flow meter is useful for measuring flow. At least 10 vial volumes of the calibration gas is purged through the headspace vial. The calibration gas flow is stopped and its needle removed from the vial first; then the vent needle is removed after allowing enough time (a few seconds) for the vial to equilibrate to atmospheric pressure. The room temperature and barometric pressure is recorded when the calibration vial is filled. The calibration vial is analyzed using the headspace and GC parameters above (headspace equilibration time must be shortened to 3 minutes).

Calibration vials should be prepared one at a time and analyzed immediately after filling to prevent analytes partitioning into the silicone portion of the septa.

If the reference concentrations of the components in the calibration gas are reported as mole or volume ppm (ppmv), these concentrations must be converted to μg/L. Use equation [1] for this conversion.

$$C_M = (MW \cdot P \cdot C_V)/(0.08205 \cdot T) \quad [1]$$

where:
- $C_M$ = concentration of component in μg/L
- $C_V$ = concentration of component in ppmv
- MW = molecular weight of volatile component, g/mol
- P = room barometric pressure in atm.
- 0.08205 L atm/K mol, ideal gas constant
- T = room temperature in K (T[Kelvin]=273.15+T[Celsius])

2) Calibration of Heavier Hydrocarbons and Polar Compounds (Liquid Standard)

A liquid calibration standard is prepared containing about 1% by weight methanol, ethanol, acetone, tert-butyl alcohol, methyl acetate, isobutylene oxide, isobutyraldehyde, 2-butanone (methyl ethyl ketone; MEK), ethyl acetate, isobutyl alcohol, tert-butyl ethyl ether, tert-amyl alcohol, n-pentane, isopentane, 2-methylpentane, 1-hexene, n-hexane in chlorobenzene, tetradecane, or another suitable solvent. Saturated straight chain hydrocarbons ($C_7$-$C_9$) may also be included in this standard and used to delineate the summed peak regions for the DB-1 column. Alternately, solutions of n-$C_7$, n-$C_8$, n-$C_9$, n-$C_{12}$ in chlorobenzene can be injected for identification of the retention time of these oligomers, and a similar approach can be applied for other oligomers or compounds. Unsaturated and branched hydrocarbons elute before the saturated straight chain hydrocarbons. All of the analytes listed above may not necessarily need to be included in this calibration solution. Different residual analytes may be present according to particular manufacturing agents used to produce the final polymer products. If testing pellets, key peroxide decomposition products include acetone and tert-butyl alcohol and methyl acetate, ethyl acetate, and MEK.

A microsyringe is used to transfer 5 to 9 μL of the standard into a headspace vial and cap it immediately. Calculate gas phase concentration in μg/L using equation 2.

$$C_M = V_C \cdot d_s \cdot C_C / V_V \quad [2]$$

where:
- $V_C$ = volume of calibration standard added to vial, μL
- $C_C$ = component's concentration in liquid calibration standard, μg/g
- $V_V$ = headspace vial volume, mL (typically 21.4 mL but varies with supplier)
- $d_s$ = density of solvent used to prepare polar standard (g/mL)

An external standard calibration method using the μg/L concentrations of the components of the calibration gas and the liquid standard is used to calculate the response factors.

$$R = C_M / A \quad [3]$$

where:
- R = response factor of component
- $C_M$ = concentration of component in calibration gas, μg/L
- A = area of peak for component The response factor calculated for n-hexane on the DB-1 column can be applied to the summed $C_7$'s, $C_8$'s, $C_9$'s $C_{12}$'s and $C_{15-18}$ hydrocarbon regions. On the Gas Pro column the response factor for n-pentane is used for the "Other $C_5$'s summed peak region, 1-hexene for the "Other $C_6$'s A", (those with retention time range between n-hexane and 1-hexene), and the response factor for n-hexane is used for the "Other $C_6$'s B" (those with retention time range between n-hexene and n-heptane). The response factor for 2-methylpentane is applied to the methylpentanes peak on the Gas Pro column (where 2-methylpentane and 3-methylpentane co-elute and are summed together).

C) Procedure

The contents of the headspace vial is analyzed using the GC and headspace parameters above. After analysis, the weight of resin sample is obtained by weighing, emptying and reweighing the sample vial. Components of interest are identified by retention time.

3. Calculation

A) Calculation of Concentrations

An external data analysis method is used on the chromatographic data system to determine peak area. The concentrations of the components in the vial headspace are calculated from the external standard response factors.

$$C_G = R \cdot A \quad [4]$$

where $C_G$ = concentration of component in the headspace, μg/L

The distribution equation [5] is used to calculate the amount of each component in the solid polymer phase in the vial from its concentration in the vial's headspace (gas phase). The Distribution Constant is obtained by: measurements from spiking experiments, calculation from a known Henry's Law Constant, or estimation using the component's boiling point and the Distribution Constants and boiling points of at least two chemically similar components.

$$K_c = \{W_S/V_S\}/\{W_G/V_G\} \quad [5]$$

where:

- $K_C$ = Distribution constant for this volatile component
- $W_S$ = mass of component in the solid phase in the headspace vial, μg
- $V_S$ = volume of solid polymer in the vial, mL
  = mass in grams of resin sample/rho
- rho = polymer density at measurement temperature, g/mL
- $V_G$ = volume of gas phase in the vial, mL = $V_V$ − $V_S$
- $W_G$ = mass of the component in the gas phase in the headspace vial, μg Given the polymer density at 23° C., one can calculate the density at temperatures up to 110° C. using equation [6].

$$\text{rho}_T = \text{rho}_{23} - 0.000214 \cdot (T(°\text{C.}) - 23) \quad [6]$$

The concentration of the volatile component dissolved in the resin when it was sampled into the headspace vial is calculated from equation 7.

$$C_R = 0.001 \cdot C_G \cdot \{V_G + K_c \cdot V_S\}/m_R \quad [7]$$

where:

C_R=concentration of component in the resin when sampled into headspace vial, μg/g m_R=mass of resin sample, g 0.001 L/mL B) Correction to Methanol Peak Area when Isobutane is Present Methanol and isobutane co-elute on the DB-1 column. When isobutane is present, its contribution to the peak area must be subtracted to obtain the peak area due to methanol. That contribution is found by calculating the ratio of isobutane's peak area to methane's peak area from the GasPro chromatogram and multiplying that ratio by the methane peak area from the DB-1 chromatogram. The corrected peak area of methanol (Equation [8]) is used in Equation [4] to calculate methanol's concentration in the headspace.

[8]

$$A_{MeOH,DB1} = A_{MeOH/iBu,DB} - A_{Methane,DB1} \times \frac{A_{iBu,GP}}{A_{Methane,GP}}$$

where:

EXAMPLES $A_{MeOH,DB1}$ = Corrected area for methanol peak on DB1 chromatogram
$A_{MeOH/iBu,DB1}$ = Area of co-eluting methanol and isobutane peak on DB1 chromatogram
$A_{iBu,GP}$ = Area of isobutane peak on GasPro chromatogram
$A_{Methane,DB1}$ = Area of methane peak on DB 1 chromatogram
$A_{Methane,GP}$ = Area of methane peak on GasPro chromatogram The catalyst used in the polymerization and catalyst poison treatment processes for examples CE1 to CE3 and IE1 to IE8 was a supported Ziegler-Natta solid catalyst comprising Mg, Ti and 3-methyl-5-tert butyl-1,2 phenylene dibenzoate as internal electron donor. The catalyst and its preparation are described in U.S. Pat. No. 8,536,372. The nominal average catalyst particle size of the catalyst is 12 micron. As co-catalyst, triethylaluminum (TEAl) was used in all examples. As mixed external electron donor (MEED), a mixture of 98 mol % isopropyl myristate (IPM) as alkyl ester activity limiting agent (ALA) and 2 mol % n-propyltrimethoxysilane (NPTMS) as silane SCA was used in examples CE1, CE2 and IE1 to IE7 and 80 mol % isopropyl myristate (IPM) and 20 mol % dicyclopentyldimethoxysilane (DCPDMS) in examples CE3 and IE8.

In all the examples the catalyst system was injected into a gas-phase pilot scale fluidized-bed reactor using a syringe pump and contacted with propylene and optionally ethylene monomer so as to produce polypropylene homopolymer (HP) and ethylene propylene random copolymer (RCP), respectively.

In the comparative examples, the product is collected from this first reactor, sampled and analyzed for properties and VOC levels.

In the inventive examples, a second gas-phase pilot scale fluidized-bed reactor was linked in series to the first reactor and the product from the first reactor was passed to the second reactor vessel. In the second reactor vessel, the reaction was terminated by means of contacting with a stream of either $CO_2$ or $H_2O$ as catalyst poison at a rate such that the poison/TEAL molar feed ratio was greater than 0.5. The $CO_2$ or $H_2O$ streams were metered and conveyed into the second reactor vessel by means of a stream of high pressure $N_2$.

In the inventive examples, the product passed from the first reactor to the second reactor is held in the second reactor at temperatures between about 90° C. and 120° C., for a residence time of between about 1.5 and 2.5 hours.

Detailed operating conditions including temperatures, partial pressures and residence times used in the examples are listed in Table 1.

Headspace samples were collected from the product from the first reactor for the comparative examples and from the second reactor for the inventive examples. VOC levels were measured using the method described above. Product properties and VOC levels are listed in Table 2.

Comparative example CE1: Polypropylene homopolymer with a nominal melt flow (MF) of 30 dg/min and xylene solubles (XS) of 2.5 wt % was produced in the first reactor with as MEED, a mixture of 98 mol % IPM and 2 mol % NPTMS. The product from the first reactor was collected and sampled for property and VOC measurement, which was used as the basis of comparison for inventive examples IE1 to IE6.

Inventive examples IE1 to IE3: Polypropylene homopolymer with a nominal melt flow of 30 dg/min and xylene solubles of 2.5 wt % was produced in the first reactor with as MEED, a mixture of 98 mol % IPM and 2 mol % NPTMS. The product was passed to a second reactor where $CO_2$ was used as catalyst poison and injected at a feed rate of 13.6 g/hour so as to terminate the reaction. The second reactor was held at a temperature of approximately 90° C., 110° C. and 120° C., for inventive examples IE1, IE2 and IE3, respectively. The product from the second reactor was sampled for property and VOC measurement. VOC reduction is reported in Table 2 for each inventive example as the % reduction from the VOC of comparative example CE1.

Inventive examples IE4 to IE6: Polypropylene homopolymer with a nominal melt flow of 30 dg/min and xylene solubles of 2.5 wt % was produced in the first reactor with as MEED, a mixture of 98 mol % IPM and 2 mol % NPTMS. The product was passed to the second reactor where $H_2O$ was used as catalyst poison and injected at a feed rate of 1 g/hour so as to terminate the reaction. The second reactor was held at a temperature of 90° C., 110° C. and 120° C. for inventive examples IE4, IE5 and IE6, respectively. The product from the second reactor was sampled for property and VOC measurement. VOC reduction is reported in Table 2 for each inventive example as the % reduction from the VOC of comparative example CE1.

TABLE 1

Preparation of the polypropylene (PP) examples

| | | CE1 | IE1 | IE2 | IE3 | IE4 | IE5 | IE6 | CE2 | IE7 | CE3 | IE8 |
|---|---|---|---|---|---|---|---|---|---|---|---|---|
| | | | | | | | | | Product Type | | | |
| | | HP | HP | HP | HP | HP | HP | HP | RCP | RCP | HP | HP |
| Reactor 1 Conditions | | | | | | | | | | | | |
| Catalyst Feed Rate | [g/hr] | 0.24 | 0.24 | 0.24 | 0.24 | 0.24 | 0.24 | 0.24 | 0.18 | 0.18 | 0.34 | 0.34 |
| Reactor Temperature | [° C.] | 70 | 70 | 70 | 70 | 70 | 70 | 70 | 70 | 70 | 72 | 72 |
| Bed Weight | [kg] | 31 | 31 | 31 | 31 | 31 | 32 | 31 | 32 | 32 | 24 | 24 |
| Residence Time | [hr] | 1.9 | 2.0 | 2.2 | 1.9 | 2.1 | 1.8 | 2.0 | 1.6 | 1.6 | 1.5 | 1.5 |
| Superficial Gas Velocity | [m/s] | 0.36 | 0.35 | 0.35 | 0.35 | 0.36 | 0.36 | 0.36 | 0.35 | 0.35 | 0.36 | 0.36 |
| Total Pressure | [psi] | 423 | 423 | 423 | 422 | 423 | 422 | 423 | 423 | 423 | 424 | 424 |
| C3 Partial Pressure | [psi] | 319 | 320 | 321 | 320 | 319 | 320 | 319 | 320 | 320 | 321 | 321 |
| H2/C3 | [mol/mol] | 0.039 | 0.037 | 0.037 | 0.037 | 0.045 | 0.039 | 0.039 | 0.066 | 0.066 | 0.103 | 0.103 |
| C2/C3 | [mol/mol] | | | | | | | | 0.025 | 0.025 | | |
| TEAl Feed Rate | [mol/hr] | 0.011 | 0.011 | 0.011 | 0.011 | 0.011 | 0.011 | 0.011 | 0.008 | 0.008 | 0.016 | 0.016 |
| TEAl/Ti Feed Ratio | [mol/mol] | 50 | 49 | 49 | 49 | 50 | 50 | 50 | 50 | 50 | 50 | 50 |
| TEAl/MEED Feed Ratio | [mol/mol] | 3 | 2 | 2 | 3 | 3 | 3 | 3 | 4 | 4 | 2 | 2 |
| Production Rate | [kg/hr] | 16 | 16 | 14 | 17 | 15 | 18 | 15 | 20 | 20 | 16 | 16 |
| Catalyst Productivity | [ton/kg] | 68 | 66 | 58 | 69 | 61 | 73 | 63 | 107 | 107 | 46 | 46 |
| Reactor 2 Conditions | | | | | | | | | | | | |
| Reactor Temperature | [° C.] | | 90 | 110 | 121 | 90 | 110 | 121 | | 110 | | 110 |
| Bed Weight | [kg] | | 33.1 | 34.2 | 34.7 | 32.8 | 34.2 | 34.4 | | 34.6 | | 34.1 |
| Residence Time | [hr] | | 2.09 | 2.43 | 2.08 | 2.22 | 1.94 | 2.27 | | 1.75 | | 2.15 |
| Superficial Gas Velocity | [m/s] | | 0.39 | 0.39 | 0.38 | 0.39 | 0.39 | 0.38 | | 0.38 | | 0.38 |
| C3 Partial Pressure | [psi] | | 200 | 200 | 200 | 200 | 200 | 200 | | 200 | | 200 |
| H2/C3 | [mol/mol] | | 0.037 | 0.036 | 0.036 | 0.036 | 0.037 | 0.036 | | 0.036 | | 0.037 |
| C2/C3 | [mol/mol] | | | | | | | | | 0.001 | | |
| Catalyst Poison Type | | | CO2 | CO2 | CO2 | H2O | H2O | H2O | | H2O | | H2O |
| Catalyst Poison Feed Rate | [g/hr] | | 14 | 14 | 14 | 1 | 1 | 1 | | 1 | | 1 |
| Catalyst Poison/Reactor 1 TEAl Feed Ratio | [mol/mol] | | 27.5 | 27.5 | 27.5 | 4.9 | 4.9 | 4.9 | | 6.7 | | 3.5 |

Comparative example CE2 and inventive example IE7: Ethylene random copolymer with a nominal melt flow of 55 dg/min and ethylene content (Et) of 4.2 wt % was produced in the first reactor with as MEED, a mixture of 98 mol % IPM and 2 mol % NPTMS. For inventive example IE7, the product was passed to the second reactor where H$_2$0 was used as catalyst poison and injected at a feed rate of 1 g/hour so as to terminate the reaction. The second reactor was held at a temperature of 110° C. The product from the first reactor was sampled for comparative example CE2 and the product from the second reactor was sampled for inventive example IE7. VOC reduction is reported in Table 2 for inventive example IE7 as the % reduction from the VOC of comparative example CE2.

Comparative example CE3 and inventive example IE8: Polypropylene homopolymer with a nominal melt flow of 80 dg/min and xylene solubles of 1.5 wt % was produced in the first reactor with as MEED, a mixture of 80 mol % IPM and 20 mol % DCPDMS. For inventive example IE8, the product was passed to the second reactor where H$_2$0 was used as at a molar rate of to terminate the reaction. The second reactor was held at a temperature of 110° C. The product from the first reactor was sampled for comparative example CE3 and the product from the second reactor was sampled for inventive example IE8. VOC reduction is reported in Table 2 for inventive example IE8 as the % reduction from the VOC of comparative example CE3.

TABLE 2

Properties of the polypropylene (PP) examples

| | | CE1 | IE1 | IE2 | IE3 | IE4 | IE5 | IE6 | CE2 | IE7 | CE3 | IE8 |
|---|---|---|---|---|---|---|---|---|---|---|---|---|
| Melt Flow | [dg/min] | 25.7 | 27.5 | 32.3 | 22.7 | 31.4 | 32.9 | 30.7 | 52.2 | 51.6 | 80.3 | 78.8 |
| Xylene Solubles | [wt %] | 3.0 | 2.6 | 2.2 | 2.8 | 3.0 | 2.8 | 3.0 | 7.3 | 7.3 | 1.5 | 1.5 |
| Ethylene Content | [wt %] | | | | | | | | 4.2 | 4.2 | | |

TABLE 2-continued

Properties of the polypropylene (PP) examples

| | | CE1 | IE1 | IE2 | IE3 | IE4 | IE5 | IE6 | CE2 | IE7 | CE3 | IE8 |
|---|---|---|---|---|---|---|---|---|---|---|---|---|
| | | | | | VOC | | | | | | | |
| C7's | [ppm] | 1.0 | 0.0 | 0.0 | 0.0 | 0.0 | 0.0 | 0.0 | 3.0 | 0.0 | 1.4 | 0.0 |
| C8's | [ppm] | 1.8 | 0.0 | 0.0 | 0.0 | 0.0 | 0.0 | 0.0 | 24.3 | 0.4 | 2.4 | 0.0 |
| C9's | [ppm] | 103.7 | 22.8 | 8.2 | 0.4 | 2.3 | 0.1 | 0.0 | 57.5 | 10.2 | 160.4 | 7.8 |
| C12's | [ppm] | 141.0 | 86.1 | 59.9 | 204.6 | 142.9 | 146.7 | 83.4 | 141.7 | 68.8 | 198.5 | 86.2 |
| VOC | [ppm] | 247.5 | 109.0 | 68.1 | 205.1 | 145.2 | 146.8 | 83.4 | 226.4 | 79.4 | 362.7 | 94.0 |
| VOC Reduction | [%] | — | 56% | 73% | 17% | 41% | 41% | 66% | — | 65% | — | 74% |

As can be seen from the above examples, polyolefin polymers can be manufactured and processed according to the present subject matter with reduced VOC level. Inventive examples IE1 to IE3 with $CO_2$ as poison shows that the optimal second reactor temperature for VOC removal is around 110° C. Inventive examples IE4 to IE6 with $H_2O$ as poison shows that the optimal second reactor temperature for VOC removal is around 120° C.

It has been shown that by using a second reactor vessel to contact a polymer passed from a first reactor with catalyst poison and maintaining the polymer for a residence time in the second reactor at a higher temperature than the temperature of the first reactor, a polypropylene polymer can be obtained with a reduced VOC level.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A process comprising:
   a. polymerizing olefin monomers and optionally comonomers in a two reactor system comprising a first reactor and a second reactor, where a polymerization product of the first reactor is routed to a second reactor where it is mixed with a polymerization product of the second reactor, thereby forming a raw product stream comprising polymerized solids, unreacted monomer and optionally comonomer, the polymerized solids comprising olefin polymer, VOC and a catalyst system;
   b. routing the raw product stream to a storage silo, thereby forming a stored polymerized solids stream;
   c. discontinuing polymerization in the second reactor;
   d. routing the stored polymerized solids to the second reactor;
   e. contacting the stored polymerized solids stream with a catalyst poison selected from carbon monoxide, carbon dioxide, oxygen, water, alcohols, amines, or mixtures thereof, thereby forming a passivated stream wherein the catalyst system is deactivated;
   f. maintaining the passivated stream in an agitated state within a second reactor; and
   g. contacting the passivated stream in the second reactor with a circulating gas comprising unreacted monomer present in an amount from 50.0 to 99.5 wt % based on the total weight of the circulating gas for a residence time, thereby reducing the concentration of VOC in the polymerized solids by at least 10 wt % compared to the level before entering the second reactor, thereby forming a purified olefin polymer solids stream, wherein the first and second reactor vessels are fluidized bed gas phase reactors.

2. The process of claim 1 wherein the passivated stream is maintained in the agitated state within the second reactor with the circulating gas.

3. The process of claim 1 wherein the passivated stream is maintained in the agitated state within the second reactor with mechanical agitation or stirring.

4. The process of claim 1 wherein the catalyst poison is contacted with the stored polymerized solids stream after leaving the storage silo but before it enters the second reactor.

5. The process of claim 1 wherein the catalyst poison is contacted with the stored polymerized solids stream after it has entered the second reactor.

6. A process comprising:
   a. polymerizing olefin monomers and optionally comonomers in a first reactor vessel, thereby forming a raw product stream comprising polymerized solids, unreacted monomer and optionally comonomer, the polymerized solids comprising olefin polymer, VOC and a catalyst system;
   b. contacting the polymerized solids with a catalyst poison selected from carbon monoxide, carbon dioxide, oxygen, water, alcohols, amines, or mixtures thereof, thereby forming a passivated stream, wherein the catalyst system is deactivated;
   c. maintaining the passivated stream in an agitated state within a fluidized bed gas phase second reactor with a circulating gas comprising unreacted monomer present in an amount from 50.0 to 99.5 wt % based on the total weight of the circulating gas for a residence time, thereby reducing the concentration of VOC in the polymerized solids by at least 10 wt % compared to the level before entering the second reactor, thereby forming a purified olefin polymer solids stream, wherein the first reactor vessel is a fluidized bed gas phase reactor.

* * * * *